UNITED STATES PATENT OFFICE.

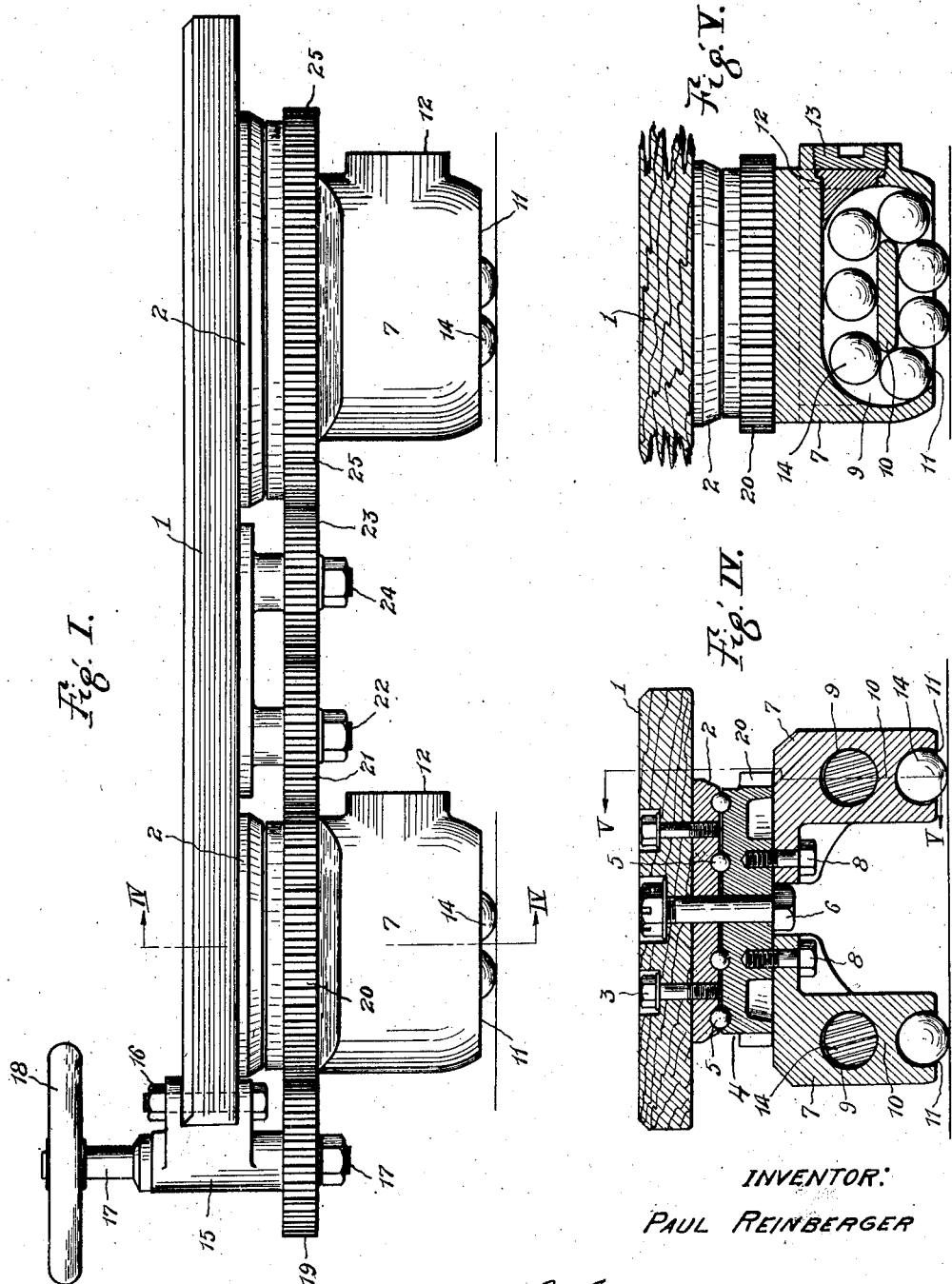
P. REINBERGER.
ROLLER SUPPORTING DEVICE.
APPLICATION FILED OCT. 4, 1919.
1,355,910.
Patented Oct. 19, 1920.
3 SHEETS—SHEET 1.
INVENTOR:
PAUL REINBERGER P. REINBERGER.
ROLLER SUPPORTING DEVICE.
APPLICATION FILED OCT. 4, 1919.
1,355,910.
Patented Oct. 19, 1920.
3 SHEETS—SHEET 2.
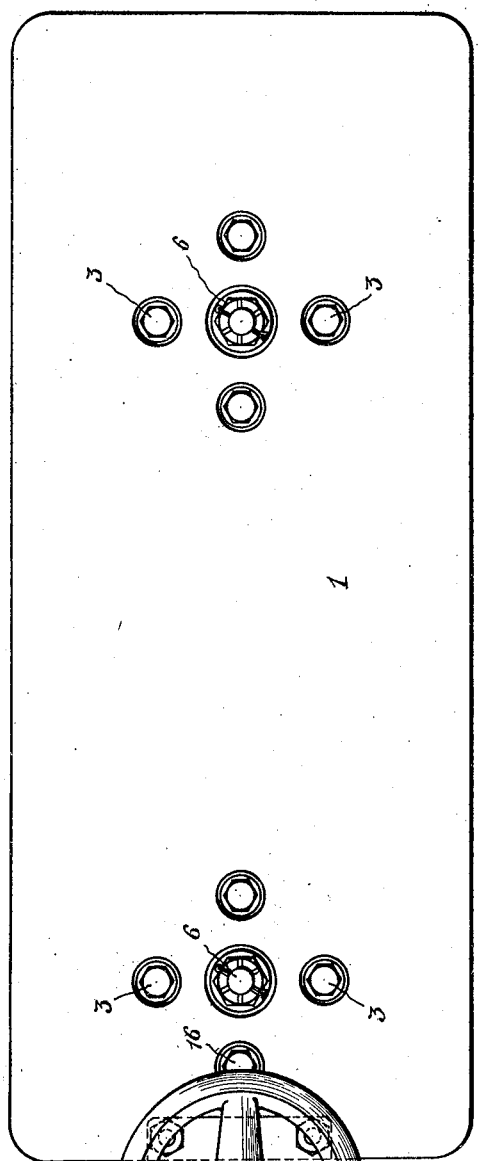
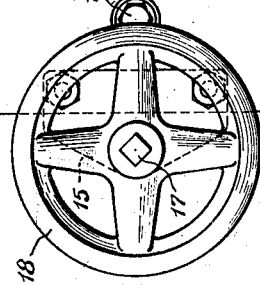
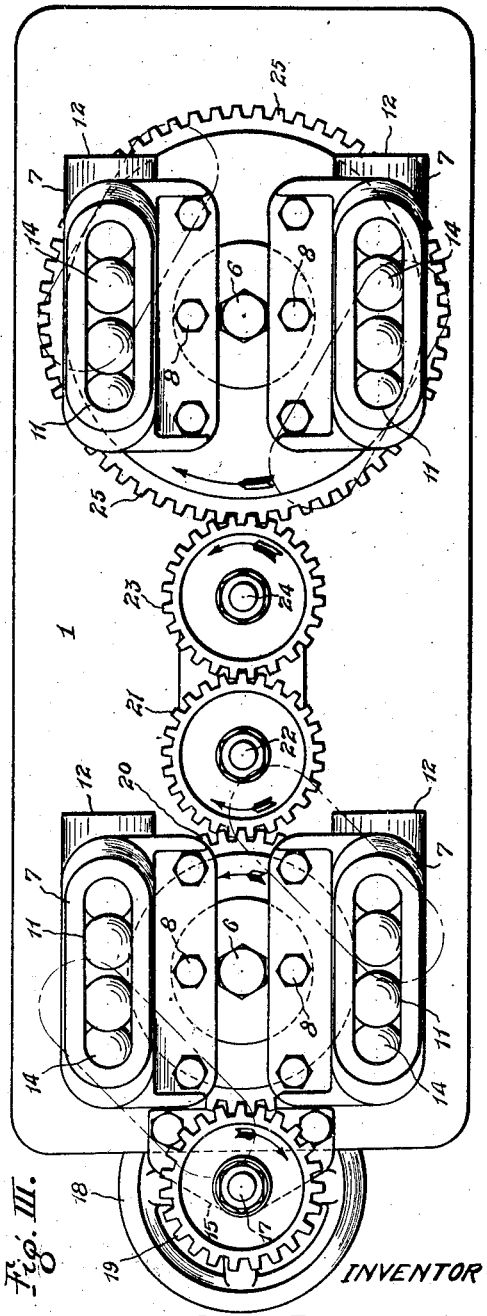
INVENTOR
PAUL REINBERGER P. REINBERGER.
ROLLER SUPPORTING DEVICE.
APPLICATION FILED OCT. 4, 1919.
1,355,910.
Patented Oct. 19, 1920.
3 SHEETS—SHEET 3.
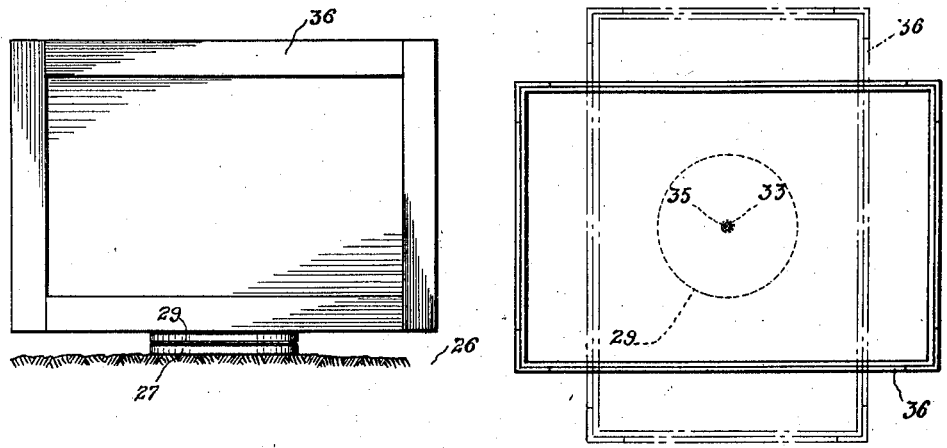
Fig. VI.
Fig. VII.
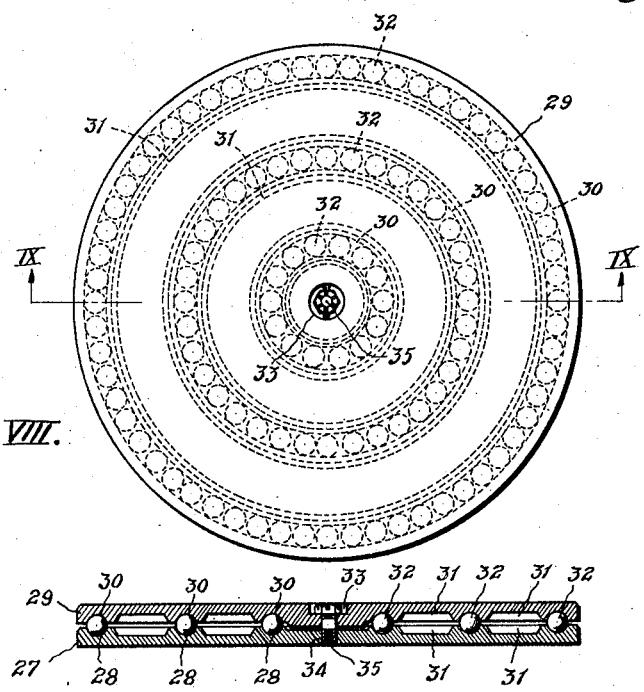
Fig. VIII.
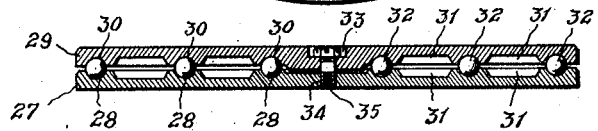
Fig. IX.
INVENTOR:
PAUL REINBERGER

PAUL REINBERGER, OF CLEVELAND, OHIO.

ROLLER-SUPPORTING DEVICE.

1,355,910.  Specification of Letters Patent.  Patented Oct. 19, 1920.

Application filed October 4, 1919. Serial No. 328,472.

*To all whom it may concern:*

Be it known that I, PAUL REINBERGER, a Croatian subject of the last King of Hungary, residing at 2538 E. 33rd St., in the city of Cleveland, county of Cuyahoga, and State of Ohio, have invented a new and useful Improvement in Roller-Supporting Devices, of which the following is a specification, the principle of the invention being herein explained and the best mode in which I have contemplated applying that principle, so as to distinguish it from other inventions.

My invention pertains to a roller supporting device and more particularly to a duplex roller bearing construction adapted for use, as exemplified in the drawings, in vehicles.

One object of my invention is the provision of a roller bearing device comprising a vertically disposed roller race adapted to be employed by way of substitution for vehicle wheels. A further object is to combine with the vertical race a superposed horizontal race in conjunction with a pivoted connection between different parts of the vehicle.

A device embodying my invention is calculated to support an immense load in proportion to its size and to make upward travel easier than by the employment of a wheel, owing in part to the antifriction elements and in part to the small diameter of the roller units.

Adverting to the drawings:—

Figure I is a side elevation of a vehicle embodying my invention.

Fig. II is a top plan view of the same.

Fig. III is a bottom plan view.

Fig. IV is a vertical cross section on line IV—IV of Fig. I.

Fig. V is a vertical longitudinal section on line V—V of Fig. IV.

Fig. VI is a side elevation of a modified form of one feature of my invention to be used as a turn table and showing a box supported thereon.

Fig. VII is a top plan view of Fig. VI.

Fig. VIII is an enlarged plan view of the turn table unit.

Fig. IX is a section on line IX—IX of Fig. VIII.

Figs. I, II and III illustrate my invention associated with a small truck such as is commonly employed by conveying heavy merchandise from one part of a factory to another. Inasmuch as the construction of the front and rear of the truck is the same in principle only one need be described and accordingly the singular number hereinafter employed. A table 1 is secured to an annular member 2 by means of four cap screws 3. The member 2 constitutes one complemental half of a roller race having a pair of concentric semi-spherical grooves located opposite a similar pair of annular grooves in another member 4. A plurality of balls 5 are disposed in the grooves so as to effect a horizontal ball bearing connection between the members 2 and 4 when held in place by a bolt 6 which passes through the parts 1, 2 and 4 as clearly shown in Fig. IV. Secured to the under side of the member 4 on opposite sides of the longitudinal middle line are a pair of blocks 7, each block being secured by a triple roll of cap screws 8. Inasmuch as the construction of the four blocks 7 is the same only one will be described. The block 7 is formed with a vertically disposed longitudinally extending ball race 9 simulating an ellipse in a section as appears in Fig. V and the top and bottom of the race are separated for a suitable distance by an integral partition 10. The lower part of the race, in fact something less than one half thereof is opened at 11. The block 7 is provided on the rear side with a flanged inlet insertion opening 12 adapted to be closed by a plug 13 in screw threaded connection with a flange 12. As appears in Fig. V, the inner end of the plug constitutes a complemental part of the wall of the race 9. A removal of the plug 13 enables the insertion of balls 14, seven of which are shown disposed around the partition 10 and two of which are adapted simultaneously to project sufficiently far through the opening 11 to simultaneously sustain the load as appears in Fig. V.

A vertical bearing bracket 15 is secured to the forward end of the table 1 by means of a bolt 16 and passed through the bearing 15 is a shaft 17 carrying at its top a steering wheel 18. The bottom of the shaft 17 carries a pinion 19 in mesh with a gear 20 which is fixed around the member 4 and in turn meshes with a pinion 21 mounted upon a short shaft 22 which depends from the table 1 in between the front and rear duplicate units. The pinion 21 engages a similar pinion 23 on a similarly supported shaft 24 and such pinion 23 is adapted to turn a gear 25 similarly mounted upon the member 4 at the rear of the vehicle. It will thus be apparent that a very short turning radius is made possible and with a minimum of frictional resistance.

It is to be understood that a truck such as is shown in Fig. I is intended to serve as a trailer and to be drawn behind an electric or otherwise propelled motor vehicle. During the movement of the trailer truck the balls 14 are moved around the partition 10 passing downwardly in front then rolling rearwardly along the traction surface and against the under side of the partition 10 and thereafter being shoved upwardly at the rear. In the meantime an operator may steer the trailer by manipulation of the wheel 18.

The modification shown on Sheet 3, Figs. VI to IX inclusive illustrates an adaptation of the horizontal roller race principle for the purpose of turn table by means of which the heavy articles, crates or boxes of merchandise may be turned with very little effort. The ball bearing race is supported upon a base 26 and comprises a lower member 27 having three concentric annular grooves 28. A complemental race member 29 is provided with correspondingly located grooves 30 in superposed relation. Between the grooves 28 and 30, each of the members 27 and 29 may be hollowed to some annular channels 31 merely for the purpose of reducing the weight of the construction. The balls 32 are disposed around each of the ball races formed by the juxtapositioning of the grooves 28 and 30. The upper member 29 is provided with a central depression 33 and the lower member 27 with screw threaded opening 34 to enable the flush insertion of a connecting screw 35. Figs. VI and VII show a box 36 resting upon the upper member 29.

I claim:

1. A device of the character described, comprising the combination of a vehicle body, a hollow structure pivotally connected with the bottom of said body, said structure being formed with a vertically disposed roller race having its under side open, and being also formed with a single continuous substantially horizontal partition extending between opposite sides of said race, balls movable around in said race and adapted to project a limited distance through said open side so as to sustain the load of said vehicle, said structure also including an opening to enable the insertion of said balls, and means for closing said opening.

2. A device of the character described comprising the combination of a block formed with a single integral partition and a vertically disposed roller race therearound having its under side open, balls movable around in said race and adapted to project a limited distance through said open side and when under load to roll against the under side of said partition, and a carriage supported upon and having a roller bearing connection with said structure enabling relative movement in a horizontal plane.

3. A device of the character described comprising the combination of a pair of structures formed with vertically disposed roller races having bottom openings, and roller elements movable around in said races and adapted to project a limited distance through said openings, a carrier, the tops of said structures having roller bearing connection with said carrier so as to form an anti-friction pivotal connection, and means for controlling the action of one of said roller bearing connections.

4. A device of the character described comprising a hollow block formed with a substantially horizontal partition and with an endless ball race disposed thereabout in a substantially vertical position, said race having its lower side open, balls in said race, and adapted partially to project through said open side, said race being additionally provided elsewhere with an opening to permit loose insertion of said balls, and a plug for closing said last mentioned opening.

5. A device of the character described comprising a hollow structure formed with a ball bearing race provided on its lower side with an opening of such size and to permit of balls partially projecting therethrough, said structure being furthermore provided with an ball insertion opening, and a plug for closing said insertion opening and having its inner end adapted to constitute a complemental part of the wall of said ball race.

Signed by me, this 30th day of August, 1919.

PAUL REINBERGER.